Jan. 2, 1962 F. WEIL 3,015,760

SEMI-CONDUCTOR DEVICES

Filed June 6, 1960

INVENTOR

FRITS WEIL

BY Frank R. Jifani

AGENT

United States Patent Office 3,015,760

Patented Jan. 2, 1962

3,015,760

SEMI-CONDUCTOR DEVICES

Frits Weil, Nijmegen, Netherlands, assignor to North American Philips Company, Inc., New York, N.Y., a corporation of Delaware Filed June 6, 1960, Ser. No. 34,205
Claims priority, application Netherlands June 10, 1959
4 Claims. (Cl. 317—234)

Figures 1, 2, 3, 4, 5, 6, 7, 8:
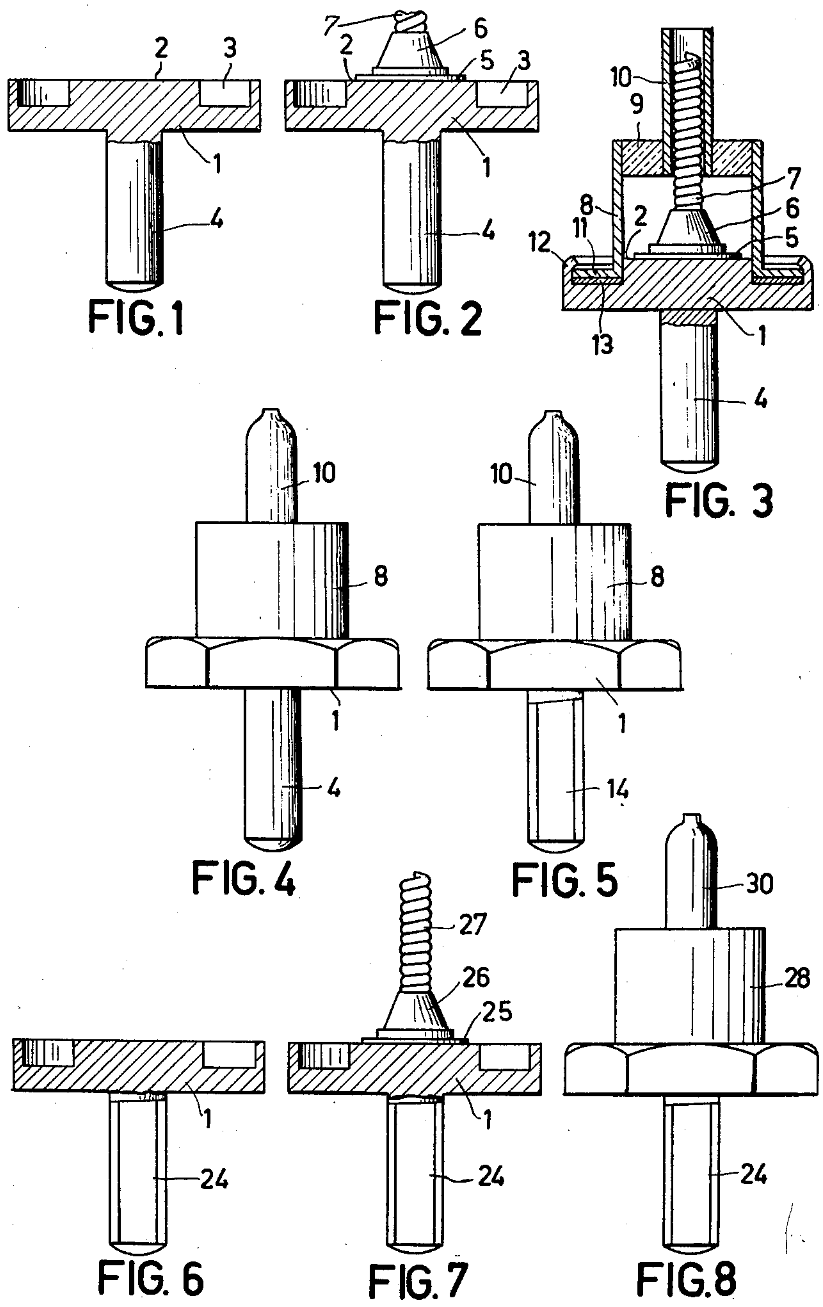

This invention relates to a method of manufacturing semi-conductor devices, such as crystal diodes and transistors, which have a metal envelope provided with at least one mounting stud. After being threaded, this mounting stud is intended for securing the envelope to a supporting or cooling plate with the aid of a nut.

In the semi-conductor devices of this kind it is usually desired that the thermal resistance between the electrically active components, which comprise a semi-conductor body and its electrodes, and the supporting plate should be as low as possible; hence, the envelope is generally made from soft copper, while the mounting stud must be so strong as to enable the envelope to be secured to the supporting plate under great pressure, that is to say, by the application of a force exceeding the force which would be determined by the weight of the device and other mechanical considerations.

The use of a copper mounting stud has a limitation in that this stud, if the copper is soft, has only a small strength and restricts the maximum permissible torque for tightening a securing nut on the stud to a low value.

The use of a hardened copper envelope, however, gives rise to a number of difficulties. In view of the exacting requirements to be satisfied by the purity of the envelopes for semi-conductor devices, it is highly desirable for these envelopes to be purified by annealing, but this softens the copper. Furthermore, such envelopes usually comprise two parts which must be joined to one another in a vacuum-tight manner and in this process must be considerably deformed along two engaging edges when they are united. This also requires a soft material.

It is known to secure the mounting stud as a separate component to a part of the envelope by soldering, and this provides a higher degree of freedom in the choice of the material for the stud. However, this construction requires additional operations and furthermore it is likely to increase the thermal resistance between the envelope and the stud. In addition, the soldering process, which must be a brazing process, requires a treatment at so high a temperature that the strength of the stud is adversely affected and that by diffusion of the soldering material the specific thermal resistance of the material of the envelope in the proximity of the soldering area increases.

It is an object of the present invention to mitigate these disadvantages.

According to the invention, the stud, which is made in known manner integrally with a part of the envelope from a soft metal, such as copper, is provided with a screwthread by a shaping operation in which no material is removed.

In such an operation without removal of material, which usually is referred to as "rolling," the material is pressed or rolled into the required shape so that, in particular with soft metals such as copper and aluminum, the material is strengthened. In contradistinction thereto, in thread cutting, which is more commonly used in precision engineering, the material is not strengthened.

Preferably, the stud is threaded after the part of the envelope, with which it is integral, has been purified by heating and after the envelope has been sealed off. In this event, there is no longer a risk of these and other impurities penetrating to the interior of the envelope during the rolling process.

However, as an alternative, the part of the envelope comprising the stud may be heated, after which the stud is threaded by an operation removing no material and finally it is purified by washing and/or etching.

In both cases, the part of the envelope bearing the stud consists of soft metal, while the material of the stud, insofar as it is threaded, is harder.

The use of the method in accordance with the invention also provides the advantage that in a late stage of the manufacture of the semi-conductor device there still is freedom in the choice of the type of the screwthread. According to the field of application, metric, Whitworth or "American National" screwthreads may be required, so that the manufacturer is obliged to keep in stock an equal number of types of semi-conductor devices. When using the above-described method, he has to stock only such devices with unthreaded studs; these studs are provided with the desired screwthread afterwards.

Hence, the invention also relates to such a semiconductor device the mounting stud of which is not yet provided with screwthread after closure of the envelope, and also to such a semi-conductor device the mounting stud of which is provided with rolled screwthread, the material of this stud at the area of the screwthread having a greater hardness than the remaining material of the envelope not subjected to deformation.

The invention will be described more fully with reference to a few embodiments given by way of example and illustrated by the drawing. The figures show successive stages of the manufacture of a semi-conductor device, such as a crystal diode.

FIGURES 1–3, 6 and 7 are axial sectional views of component parts, FIGURES 4, 5 and 8 are side elevations of a complete crystal diode in its envelope.

The diode is accommodated in an envelope the base 1 of which consists of soft (red) copper with a hardness of at most 70 V.P.N. (Vickers Pyramidal Number), for instance about 40 to 50 V.P.N. The base is provided at its upper side with a plateau 2 surrounded by a groove 3 and at its lower side with a cylindrical mounting stud 4. The base is subjected to a cleaning etching treatment by immersing it for a few seconds in a bath consisting of 1 litre of water, 4 litres of nitric acid, 3 litres of sulphuric acid and 60 grams of common salt, after which it is washed and dried. Then the base is heated to about 500° C. under reducing conditions.

A rectifier element 5 provided with a contact member 6 and a conducting stranded wire (litzendraht) 7 is now secured to the plateau 2 by soldering (FIGURE 2). The details of the rectifier element, which may comprise a germanium or silicon crystal, are irrelevant to the invention.

After the provision of this rectifier element, the envelope is closed by a hood or cap 8 including a feed-through insulator 9 and a lead-in tube 10. Along the lower rim of the hood 8 is provided a flange 11 which fits in the groove 3 of the base 1. The flange 11 is secured in the base by bending over the rim 12 of the base, while sealing of the envelope may be promoted by the provision, under the flange 11, of a washer 13 made of a soft metal, for example, lead, tin or indium.

The lead-in tube 10 containing the litzendraht 7 then is closed by welding, see FIGURE 4.

Finally a screwthread 14 is provided on the stud 4 by rolling, so that the strength of the material of this stud is increased, while the remainder of the material of the base 1 remains soft and retains its high thermal conductivity (FIGURE 5). By securing units on studs 4 with a diameter of 8 mm. it was shown that a thread manufactured by thread-rolling could withstand a torque of 75 kg. cm. without deformation, whereas a thread manufactured by thread-cutting was deformed when the torque was only 30 kg. cm.

Thread rolling, a known technique in tool engineering and f.i. described in "Tool Engineers Handbook" (McGraw-Hill Publity Ltd.), first edition, 1951, pages 814 to 824, is generally performed with the aid of tools and in rooms which do not meet the exacting requirements with respect to cleanness which must be satisfied in the treatment of the electrically active components of semiconductor devices. Hence, the screwthread 14 should preferably be provided after sealing of the envelope inclusive of the lead-in tube 10. However, if due regard is paid to precautions against the penetration of impurities through this tube, the tube 10 may be sealed after the provision of the screwthread 14 on the stud 4.

The following procedure may be considered as a modification of the method in accordance with the invention. The soft-copper base of FIGURE 1 is heat treated and then provided with screwthread 24, see FIGURE 6. Thereupon it is washed in trichlor-ethylene and subsequently etched in the etching liquid described hereinbefore.

The electrically active components, comprising a rectifier element 25, a connecting terminal 26 and a litzendraht 27 are provided, see FIGURE 7, and finally a hood 28 is mounted and a lead-in tube 30 is sealed, see FIGURE 8.

What is claimed is:

1. A semiconductor device comprising a sealed envelope, said envelope including a one-piece copper base member having a depending, cylindrical, mounting stud, a semiconductor element mounted on said base within the envelope, and a rolled screw-thread on the stud and adapted to be engaged by a nut for attachment of said device to a mounting surface, most of said copper base member having a hardness below 70 VPN, the said rolled screw-thread exhibiting significantly greater hardness than the said most of said copper base member.

2. A device as set forth in claim 1, wherein the base member comprises a plateau surrounded by a recessed portion, the semiconductor element is mounted on the plateau, and a cup-shaped envelope portion is sealed to the base member at the said recessed portion.

3. In the method of manufacturing a semiconductor device wherein a semiconductor element is mounted on a one-piece copper base member having a hardness below 70 V.P.N. and a depending, cylindrical, mounting stud and a cup-shaped envelope portion is sealed to and over the base member to enclose in a hermetic manner the semiconductor element, the improvement comprising rolling screw-threads onto the stud to materially increase their hardness and strength relative to the remainder of the base and thereby improve the attachment of said device to a mounting surface.

4. A method as set forth in claim 3 wherein the rolling step follows the hermetic sealing of the envelope.

References Cited in the file of this patent

UNITED STATES PATENTS

| | | |
|---|---|---|
| 2,893,904 | Dickson | July 7, 1959 |
| 2,898,668 | Knott et al. | Aug. 11, 1959 |